UNITED STATES PATENT OFFICE.

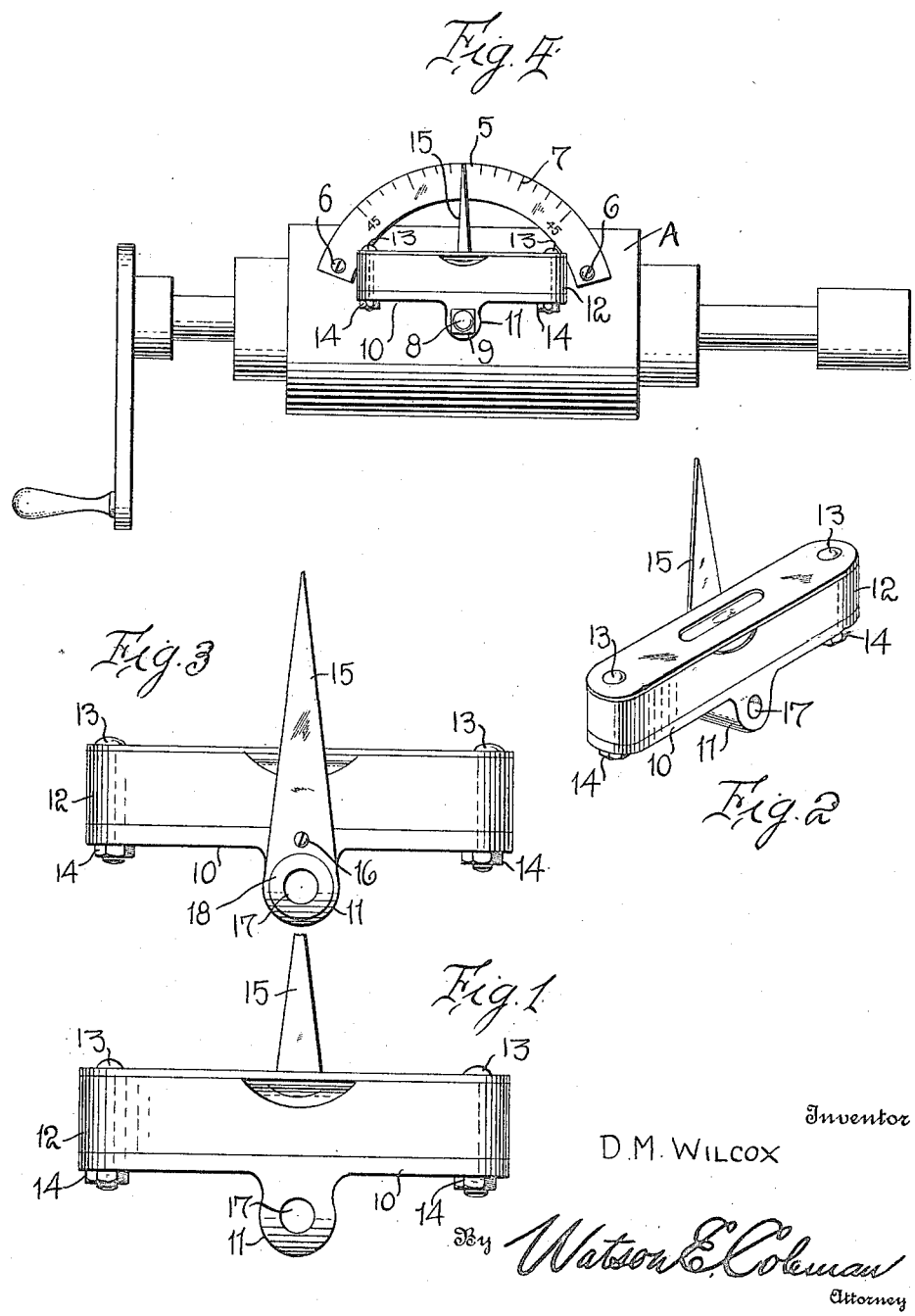

DANIEL MORGAN WILCOX, OF KREBS, OKLAHOMA.

INCLINOMETER.

1,222,831.    Specification of Letters Patent.    Patented Apr. 17, 1917.

Application filed June 15, 1916. Serial No. 103,843.

*To all whom it may concern:*

Be it known that I, DANIEL MORGAN WILCOX, a citizen of the United States, residing at Krebs, in the county of Pittsburg and State of Oklahoma, have invented certain new and useful Improvements in Inclinometers, of which the following is a specification, reference being had to the accompanying drawings.

This invention is a level or inclinometer more particularly adapted for use with and upon coal mining machines.

One object of this invention is to provide a level and inclinometer that may be readily attached to or detached from a post, puncher or other mining machine.

Another object of this invention is to provide a level and inclinometer to be used in conjunction with the segment adjustment of a mining machine so that the pitch of the engine will be the same as the pitch of the vein to be cut.

A further object of this invention is to provide a level and inclinometer with a bubble case which is secured to a support having a pivotal mounting.

A still further object is to provide a pivotally mounted bubble case support, with a pointer which is secured to the support, one end of the pointer being adapted to coöperate with the pivot and a scale.

The invention broadly stated comprises a bubble case and a support therefor including a pivotal mounting, the case being secured at its ends to the support, the support being provided intermediate of its ends with a boss through which passes the pivot, and a pointer secured to one edge of the support and also provided with an aperture through which passes the pivot, the securing means and the pivot operating to maintain true alinement between the bubble and a graduated scale.

One practical form of the invention will be described and illustrated in the accompanying drawings, in which—

Figure 1 is a front elevation;

Fig. 2 is a perspective view of the support and pointer;

Fig. 3 is a rear elevation of the bubble case and support;

Fig. 4 is a front elevation of a worm box with the inclinometer in position.

The scale 5 may be secured to the machine in any suitable way, one means being by the screws 6. This scale may have any conventional graduations or may be marked in an arbitrary manner, as may be desired. Certain markings are shown thereon, as indicated by the numeral 7. A part of the machine, indicated at A will be shown so that the manner of attachment may be illustrated. Disposed below the scale is a pivot pin 8 which may be provided at its outer end with threads to coöperate with the nut 9.

Positioned on this pivot pin is a support 10 which comprises a flat member having substantially parallel sides and a boss 11 disposed intermediate of its ends. This boss is preferably positioned transversely of the support and is provided with a suitable hole through which passes the pivot pin 8.

A bubble case 12 is secured to the support 10 by means of the bolts 13 and the nuts 14. These bolts 13, as shown, preferably pass through suitable holes formed in the ends of the bubble case and through suitable apertures formed in the support 10. This bubble case 12 may be of the usual or customary type, or it may be formed especially for the particular work to which it is desired to be put.

A pointer 15 is secured to the support 10 upon one lateral edge by the fastening means 16, as shown. This pointer is provided with a suitable aperture 17 which is in alinement with the hole formed in the boss 11. The securing means 16 being spaced from the pin 8 passing through the boss 11 maintains the pointer in a predetermined position. This pointer 15 may be of any desired shape and, as shown, has the end which coöperates with the scale 5 formed to coöperate therewith. The lower end may be rounded to conform to the contour of the boss. To space the bubble case with its support and pointer out of contact with the machine A, a suitable washer 18 may be employed, as shown. In practical use in the cutting of coal especially on a pitching vein, it is impossible to set the machine accurately so that it will cut clean, that is, in cutting on the bottom of the vein, the drill will either cut into the bottom or above the bottom, leaving a layer of coal that has to be removed by hand at quite an expense to the coal operator.

To set the machine for mining in the room, that is, going up with the pitch of the coal, first set the post or column of the machine, then set the segment by means of the worm or other gear of the particular type of machine used. Then lay the engine on the bottom of the entry from which the room is being driven and across the entry so that the engine will lie at the same pitch as the vein of the coal. Then move the inclinometer until it shows level, noting the degree to which the indicator points on the segment of the device. Then take the engine and attach it to the post or column and adjust the pitch of the engine so that the indicator or pointer of the device points to the same degree on the segment of the device, with the spirit level showing "level." The engine will then be standing ready to work at the exact pitch of the vein. To obtain these several inclinations, it is thought preferable to mount one of the inclinometers on the engine and one on the gear box so that the piston rod operating the pointer head will move in the desired direction.

In cutting entry ways, that is, cutting across the pitch of the vein, set the post as before, lay the engine on the bottom, and set the device on the engine as previously done. This gives the pitch of the vein which is also the pitch of the bottom of the entry. Then on the inclinometer, attached to the segment, set the pointer to indicate the same degree as on the engine, then adjust the segment so that the spirit level will show "level." The segment C will then be standing with the pitch of the vein. Then attach the engine, set it level and it will cut the entry on a level with the vein.

This level or inclinometer may be so formed that it may be permanently attached to the machine or it may be so formed that it will be a separate structure which can be used in conjunction with the machine. The several parts entering into the construction may be formed of any suitable material which will give the necessary strength and rigidity to the device.

Minor changes in the form and details of construction may be resorted to without departing from the spirit of my invention or the scope of the appended claims.

Having thus described this invention, what is claimed is:—

1. An inclinometer including a fixed degree scale, an oscillatably mounted supporting plate, a bubble case removably secured upon said supporting plate, and a pointer detachably fixed to the supporting plate and movable over the degree scale.

2. The combination with a boring tool having a fixed pivot stud projecting from its body, of a plate removably mounted intermediate of its ends upon said pivot stud, a bubble case fixed upon said plate, a graduated degree scale secured to the body of the tool, and an index element detachably secured to said plate and movable therewith with respect to the scale.

3. The combination with a boring tool having a fixed pivot stud projecting from its body, of a plate provided with a boss intermediate of its ends loosely mounted to oscillate upon said stud, a bubble case secured upon said plate, a graduated degree scale fixed to the tool body, an index element provided with an opening in one end for engagement upon one end of said boss, and an attaching screw for said element having threaded engagement in the plate in spaced relation to said boss to detachably secure the index element thereto for oscillation with the plate.

In testimony whereof I hereunto affix my signature in the presence of two witnesses.

DANIEL MORGAN WILCOX.

Witnesses:
 CLAUDE WAYMIRE,
 J. E. WAYMIRE.

Copies of this patent may be obtained for five cents each, by addressing the "Commissioner of Patents, Washington, D. C."